United States Patent

Bridges

[11] 3,754,640
[45] Aug. 28, 1973

[54] INSULATED TRAY AND COVER THEREFOR
[75] Inventor: John A. Bridges, Nashville, Tenn.
[73] Assignee: Aladdin Industries, Incorporated, Chicago, Ill.
[22] Filed: July 9, 1970
[21] Appl. No.: 53,546

[52] U.S. Cl............ 206/4, 220/9 F, 220/16, 220/23.6, 220/23.8
[51] Int. Cl.............................. A45c 11/20
[58] Field of Search............ 220/16, 9 F, 23.6, 220/23.8, 70; 206/4

[56] References Cited
UNITED STATES PATENTS
| | | | |
|---|---|---|---|
| 2,070,905 | 2/1937 | Justheim | 220/16 |
| 3,016,129 | 1/1962 | King | 206/4 |
| 3,103,278 | 9/1963 | Kuzma et al. | 220/9 F UX |
| 2,948,430 | 8/1960 | Teague, Jr. et al. | 220/9 F |
| 3,298,554 | 1/1967 | Piker | 220/9 F X |
| 2,436,097 | 2/1948 | Clarke | 206/4 |
| 3,122,265 | 2/1964 | Innis | 206/4 X |
| 3,532,247 | 10/1970 | Bridges | 220/23.6 |

Primary Examiner—Samuel B. Rothberg
Assistant Examiner—James R. Garrett
Attorney—McDougall, Hersh & Scott

[57] ABSTRACT

This application discloses an insulated tray and cover therefor. The tray is provided with food holding receptacles having insulated bottom and side walls while the cover has co-extensive insulated spaces so that when the cover is placed on the lid completely insulated food holding compartments are formed. Interengaging elements are formed on the trays and covers so that seals are formed and alternating trays and covers may be placed on one another to form a stack.

4 Claims, 5 Drawing Figures

Patented Aug. 28, 1973

INVENTOR
John A. Bridges
by McDougall, Hersh and Scott
Attys

Patented Aug. 28, 1973 3,754,640

INSULATED TRAY AND COVER THEREFOR

BACKGROUND OF THE INVENTION

This invention relates generally to trays for food service. More specifically, it relates to insulated trays useful in mass feeding operations.

The service of individual food portions to persons riding on airplanes and other modes of transportation or in hospitals or similar institutions has a number of problems. One of these is the desire to maintain the food at desired serving temperatures even though it has been prepared and the individual portions divided out of large cooking means some considerable time before actual service to an individual. Another problem is that whereas in an institution or on an airplane it is desired to serve a meal during a particular period there are individuals who may not want to eat all or part of their food at the time of service. In such situations, it is still desired to maintain the food of persons at desired temperatures as long as it is to be consumed within a reasonable time.

Therefore, it is an object of this invention to provide a novel tray and cover combination which effectively insulates food portions in individual compartments to maintain them at their desired serving temperatures for extended periods of time.

It is another object of this invention to provide a novel tray and cover combination for use in serving meals in institutions and the like which are provided with means whereby sets of trays and covers may be stacked one on top of the other.

SUMMARY OF THE INVENTION

The foregoing and other objects are achieved in one embodiment of the invention in which a tray is provided with insulated food holding receptacles and is in combination with a cover having insulated spaces coextensive with the receptacles so that when the cover is placed on the tray completely insulated food holding compartments are formed. Means are provided for sealing the compartments and facilitating the stacking of sets of trays and covers.

BRIEF DESCRIPTION OF THE DRAWINGS

The invention is set forth in the claims forming a part of this specification while an understanding of the structure and function of an embodiment thereof may be obtained from the detailed description taken in conjunction with the drawings in which:

DETAILED DESCRIPTION

Figure 1:
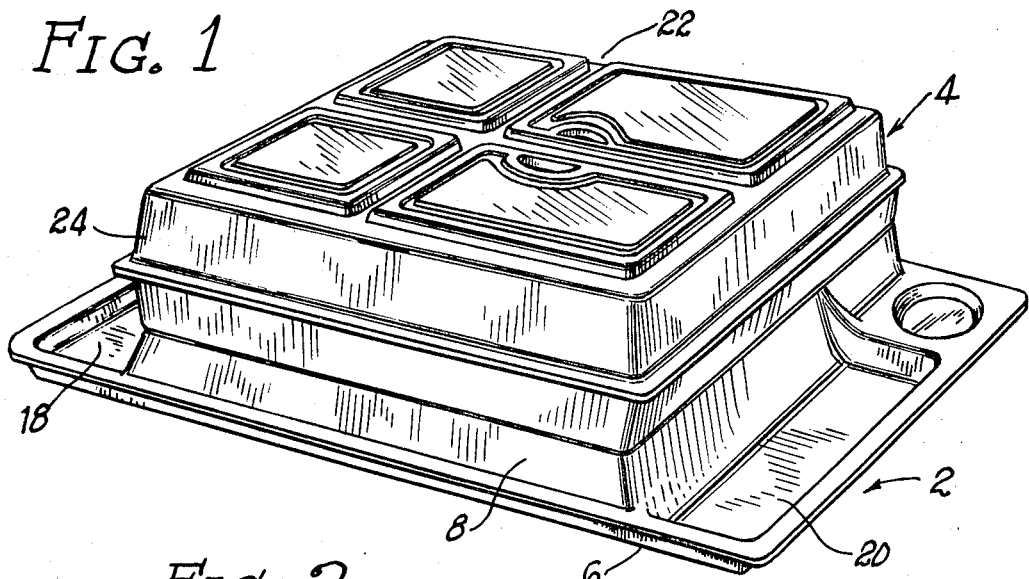
FIG. 1 is a perspective illustration of a tray and cover in accordance with the invention.
Figure 2:
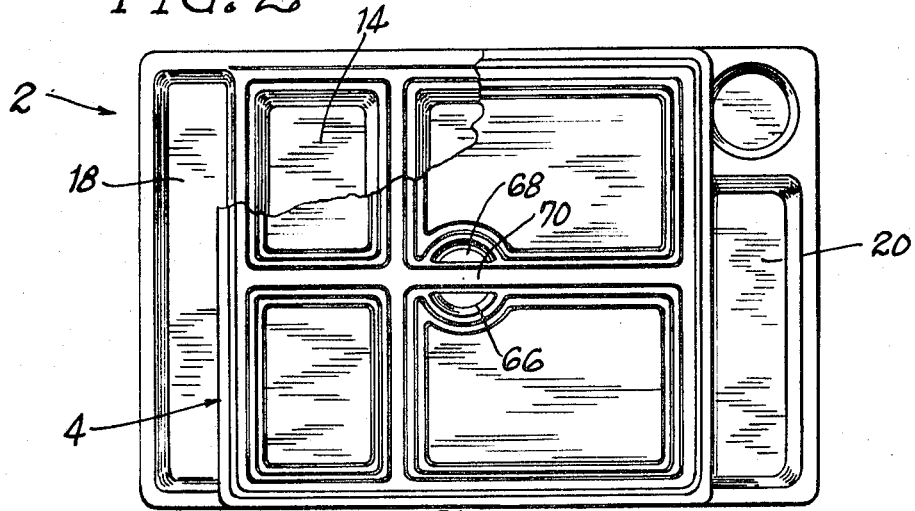
FIG. 2 is a top view of the embodiment of FIG. 1 with the cover partially broken away.

In the embodiment of the invention illustrated in the various figures, there is shown a tray 2 and a cover 4. The tray comprises a base portion 6 having a raised central portion 8 in which are formed a plurality of food holding receptacles 10, 12, 14 and 16. Extending from each side of the central portion 8 are receptacles 18 and 20 for holding containers for beverages such as milk or juice, eating utensils, condiments or the like which do not need to be insulated.

The cover 4 is formed with a top surface 22 and downwardly extending side walls 24 and partitions 26 which together form enclosed spaces 28, 30, 32 and 34 coextensive with corresponding receptacles 10, 12, 14 and 16. When the cover is placed on top of the tray, the receptacles and spaces form insulated compartments for holding and maintaining individual food portions at the serving temperature desired for each such portion. Because the compartments are insulated from each other, a food desired to be served hot, such as a meat entree, can be placed in one compartment while another food desired to be served cold or chilled, such as ice cream or a salad, can be placed in an adjoining compartment.

Generally, the insulated tray 2 comprises an upper cover member or skin 36 providing an upper surface, and a lower cover member or skin 38 providing a lower surface with a space 40 therebetween. The space 40 is partly or entirely filled with an insulating material 42, having a high heat insulating value. Preferably, the insulating material 42 is in the form of resinous plastic foam, such as polyurethane or polystyrene foam, for example. The insulating material may be formed in place within the space 40, or may be introduced in some other manner into the space.

The cover members 36 and 38 are preferably made of suitable resinous plastic materials, which will withstand heat, cold, moisture, and the various acids and other chemical agents which are commonly found in foods. For example, the cover members may be made of polypropylene, polyethylene, polycarbonate, or the like.

The upper and lower cover members 36 and 38 are formed with edge portions or flanges 44 and 46, which are joined together, preferably around the entire periphery of the tray 2. In this way, the space between the cover members is sealed against the entry of moisture or any foreign material. The flanges 44 and 46 may be welded together by the application of heat and pressure, or may be joined together by solvent welding, or by the use of a suitable adhesive. It may be seen that the joined flanges 44 and 46 project outwardly in a generally horizontal direction around the periphery of the tray. Thus, the tray may be handled very conveniently by gripping the flanges.

Figure 3:
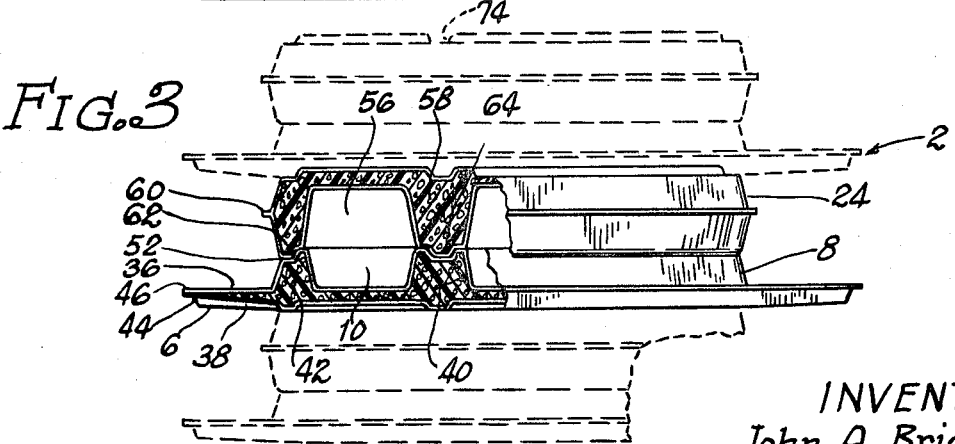
FIG. 3 is a side view of a stack of trays and covers in accordance with the invention with one tray and cover partially in section.
Figure 4:
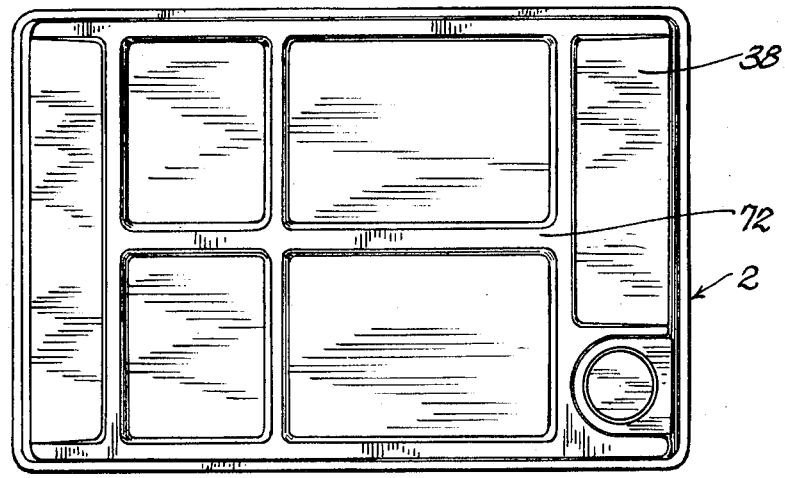
FIG. 4 is a bottom view of the tray shown in FIG. 1.
Figure 5:
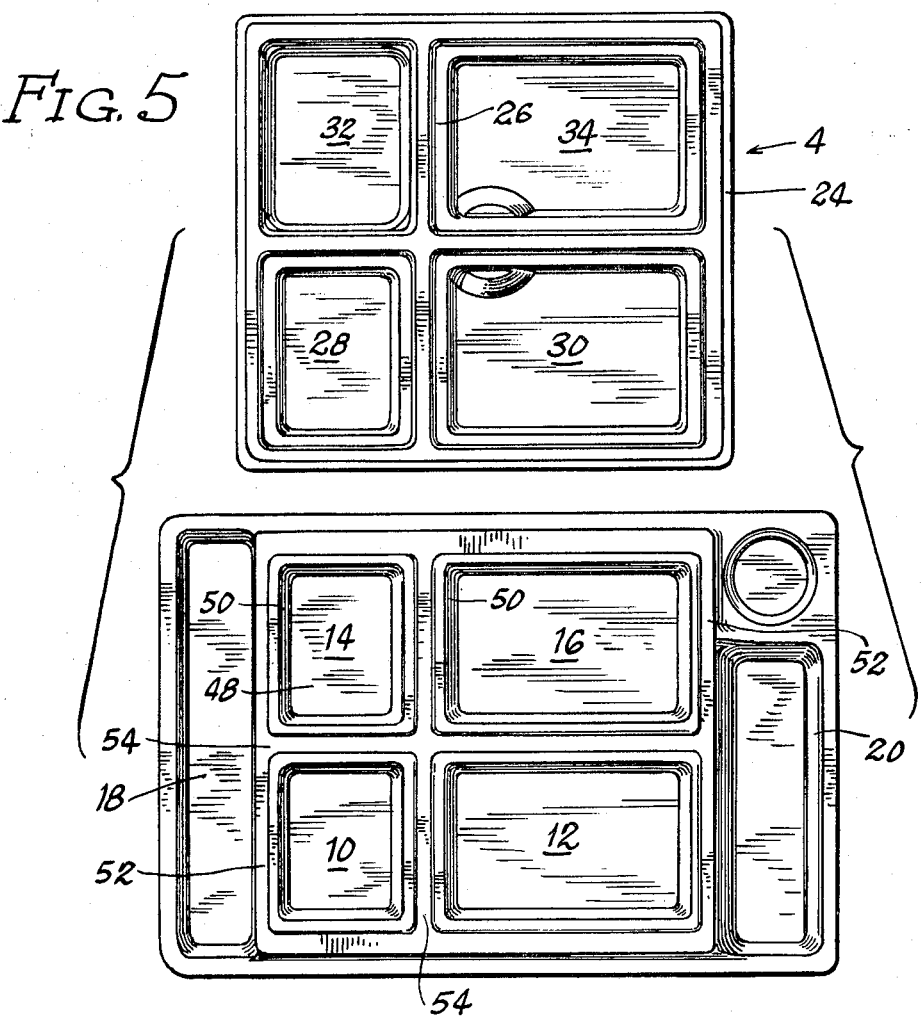
FIG. 5 is an illustration of the bottom of the cover and the top of the tray to show how the cover may be placed on the tray.

Each one of the receptacles 10, 12, 14 and 16 is provided with a bottom surface 48 and side walls 50 constituted by the upper surface of the upper cover member 36. The side walls 50 are spaced apart and the space therebetween is filled with the insulating material so that insulation is provided between each food holding receptacle and the exterior of the tray. As may be seen in FIG. 3, the bottom wall of each receptacle is formed so as to be relatively thin as compared to the side walls. Thus, the heat transfer vertically is greater than that horizontally. The upper surface 36 is formed to have a peripheral sealing surface 52 and sealing surfaces 54 between each compartment. As shown in the illustrated embodiment, the sealing surfaces 52 and 54 are shaped to have depressed or lower portions.

The spaces 28, 30, 32 and 34 in the cover 4 formed by the outer wall 24 and partitions 26 are coextensive with corresponding food holding receptacles 10, 12, 14 and 16. The cover itself is likewise provided with a lower surface or skin 56 as well as the upper surface or skin 22 with a space 58 therebetween. The space 58 is likewise filled with an insulating material 60 having a high heat insulating value. As with the case of the bottom walls of the receptacles in the trays, the top walls of the spaces in the cover are formed to be considerably thinner than their side walls, as may be seen in FIG. 3.

The lower surface 56 of the cover 5 is formed so as to have peripheral sealing surfaces 62 and 64 formed therein in such a way as to engage the sealing surfaces 42 and 54 of the tray. Thus, when the cover is placed on the tray the sealing surfaces engage each other and form completely insulated food holding compartments. The compartments are not only insulated from each other but are insulated from the exterior. As may be seen in the drawings, the insulation provided in the bottom and top of the food holding compartments when the trays are not stacked is less than that provided in the side walls.

The upper surface 22 of the tray 4 may have two depressions 66 and 68 formed therein to provide a handle 70 for gripping the cover to raise it from the tray.

The bottom surface 38 of the tray is likewise provided with formed surfaces 72 formed to engage corresponding sealing surfaces 74 of the cover 4. Thus, as may be seen in FIG. 3, a stack of trays and covers may be provided by placing a tray on top of a cover 2 in such a way that the surfaces 74 of the cover engage the corresponding surfaces 72 of the tray so that they will resist any tendency to slip from each other or topple over. As shown in the drawings, the surfaces 72 and 74 as well as the surfaces 62 and 64 may be shaped as tongue and groove elements so as to interlock when the trays and covers are stacked or only when a cover is placed on a tray.

When a plurality of alternating trays and covers are stacked, a plurality of vertical columns of compartments are formed. Each compartment is thermally insulated from every other compartment and from the outside environment. Because the top and bottoms of each compartment even though insulated are thinner than the side walls the insulation between compartments in the vertical direction of the stack is less than that in the horizontal direction. Thus, the vertical heat transfer is greater than the horizontal. When individual food portions are placed in the tray receptacles, those foods desired to be served hot are placed in the correspondingly located receptacles in each tray while those desired to be served cold are placed in correspondingly located receptacles. Then when the trays are stacked with alternating covers, the food portions will be in separate vertical columns of relatively cold and relatively hot foods. Inasmuch as the heat transfer is greater vertically than horizontally, foods of like temperatures will be maintained at or near their desired serving temperatures for longer periods of time for they will tend to heat or cool each other, as the case may be, in the vertical direction.

By virtue of the structure shown and described a tray and cover combination is provided which can accommodate individual food portions and maintain them at desired serving temperatures for a substantial period of time. Inasmuch as the food holding components are insulated from each other, a food portion intended to be served at a relatively warm or hot temperature may be placed side by side with a food portion intended to be served cold or chilled and the tendency of the temperature of one such food portion to effect the temperature of the other is thereby considerably reduced. A number of trays and covers may be stacked permitting them to be transported from a central food preparation area to individual locations such as hospital rooms where the food is intended to be consumed. By providing a separate tray and cover for each place of service, it is possible for the person for whom the food is intended to eat at his convenience and still be assured of having food which is palatable because it is being held at the proper serving temperature.

Various other modifications, alternative constructions and equivalents may be employed without departing from the true spirit and scope of the invention as exemplified from the foregoing description and as defined in the following claims.

What is claimed as new and desired to be secured by Letters Patent of the United Stages is:

1. In combination a tray and cover therefor, said tray having a base portion, a plurality of food holding receptacles formed on the upper surface of said base portion, each receptacle having a bottom and side walls upstanding therefrom, a relatively thin layer of heat insulating material on the bottom of each receptacle, each receptacle side wall having a layer of heat insulating material much thicker than the insulation of the receptacle bottom between it and an adjoining receptacle side wall and in its own outer side, interengaging portions on the upper surface of each side wall, interengaging portions formed on the lower surface of said base portion, said cover having a top portion and side walls and partitions depending therefrom to form a plurality of divided spaces, each coextensive with one of said receptacles in said tray so that when said cover is placed over said tray a plurality of completely enclosed food holding compartments are formed, said top portion having a relatively thin layer of heat insulating material, said top portion side walls and partitions having a layer of heat insulating material much thicker than the insulating material of the cover top portion, interengaging portions on the bottom of said top portion side walls and partitions for engagement with corresponding portions on the upper surface of said receptacle side walls to form a seal, and interengaging portions on the upper surface of said cover for mating engagement with corresponding interengaging portions on the lower surface of said tray so that a plurality of alternating trays and covers may be stacked.

2. The combination of claim 1 wherein gripping means are formed in the upper surface of said cover.

3. The combination of claim 1 wherein each of said tray and said cover is formed by two sheets of rigid material spaced apart at said base portion, top portion side walls and partitions and said layers of insulating material are formed by foamed plastic in the spaced apart portions.

4. In combination a tray and cover therefor, said tray having a base portion, a plurality of food holding receptacles formed on the upper surface of said base portion, each receptacle having a bottom and side walls upstanding therefrom, a relatively thin layer of heat insulating material on the bottom of each receptacle, each receptacle side wall having a layer of heat insulating material much thicker than the insulating material of the receptacle bottom between it and an adjoining receptacle side wall and in its own outer side, interengaging portions on the upper surface of each side wall, interengaging portions formed on the lower surface of said base portion, said cover having a top portion and side walls and partitions depending therefrom to form a plurality of divided spaces, each coextensive with one of said receptacles in said tray so that when said cover is placed over said tray a plurality of completely enclosed food holding compartments are formed, said top portion having a relatively thin layer of heat insulating material, said top portion side walls and partitions having a layer of heat insulating material much thicker than the insulating material of the cover top portion, interengaging portions on the bottom of said top portion side walls and partitions for engagement with corresponding portions on the upper surface of said receptacle side walls to form a seal, interengaging portions on the upper surface of said cover for mating engagement with corresponding interengaging portions on the lower surface of said tray so that a plurality of alternating trays and covers may be stacked and wherein said tray has at least one portion extending laterally from said receptacles and said cover is coextensive with only the receptacles.

* * * * *